United States Patent
Shook et al.

(10) Patent No.: US 8,055,710 B2
(45) Date of Patent: Nov. 8, 2011

(54) SYSTEM, METHOD AND COMPUTER PROGRAM PRODUCT FOR INTELLIGENT MULTI-PERSON CHAT HISTORY INJECTION

(75) Inventors: Aaron K. Shook, Raleigh, NC (US); Andrew Ivory, Wake Forest, NC (US); Erik J. Burckart, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 12/237,034

(22) Filed: Sep. 24, 2008

(65) Prior Publication Data

US 2010/0077029 A1    Mar. 25, 2010

(51) Int. Cl.
    *G06F 15/16* (2006.01)
(52) U.S. Cl. ..................... 709/204; 709/206
(58) Field of Classification Search ........... 709/204–207
    See application file for complete search history.

(56) References Cited

U.S. PATENT DOCUMENTS

| | | | |
|---|---|---|---|
| 7,356,567 B2 * | 4/2008 | Odell et al. | 709/206 |
| 7,499,926 B1 * | 3/2009 | Burckart et al. | 1/1 |
| 7,519,730 B2 * | 4/2009 | Bailey et al. | 709/237 |
| 2004/0186721 A1 * | 9/2004 | Beynon et al. | 704/270 |
| 2005/0187781 A1 * | 8/2005 | Christensen | 705/1 |
| 2006/0149818 A1 * | 7/2006 | Odell et al. | 709/206 |
| 2006/0212518 A1 * | 9/2006 | Bailey et al. | 709/205 |
| 2007/0022213 A1 * | 1/2007 | Fahmy et al. | 709/246 |
| 2007/0101009 A1 * | 5/2007 | Chen et al. | 709/229 |
| 2007/0130257 A1 * | 6/2007 | Bedi et al. | 709/204 |
| 2007/0300169 A1 * | 12/2007 | Jones et al. | 715/764 |
| 2008/0086317 A1 * | 4/2008 | Jones et al. | 705/1 |
| 2008/0123686 A1 * | 5/2008 | Lee et al. | 370/466 |
| 2008/0162633 A1 * | 7/2008 | Scherpa et al. | 709/204 |
| 2008/0189276 A1 * | 8/2008 | Beadle et al. | 707/5 |
| 2008/0189374 A1 * | 8/2008 | Odell et al. | 709/206 |
| 2009/0138520 A1 * | 5/2009 | Burckart et al. | 707/104.1 |
| 2009/0138828 A1 * | 5/2009 | Schultz et al. | 715/853 |
| 2009/0319941 A1 * | 12/2009 | Laansoo et al. | 715/784 |
| 2010/0017483 A1 * | 1/2010 | Estrada | 709/206 |

\* cited by examiner

*Primary Examiner* — Thu Nguyen
*Assistant Examiner* — Julian Chang
(74) *Attorney, Agent, or Firm* — Scully, Scott, Murphy & Presser, P.C.; Andre Gibbs, Esq.

(57) ABSTRACT

A method, system, and computer program product is provided for automatically searching and injecting a multi-person chat history into a chat session, and allowing users to inject a multi-person chat history into a new chat session. After comparing new chat session participants with chat history participants stored in a chat log within a predetermined temporal window to determine a number of similar participants after the new chat session is created, there is performed one of injecting the chat history into the new chat session automatically when the number of similar participants is at least as great as a first predetermined threshold; or prompting a user response to inject the chat history into the new chat session when the number of similar participants is at least as great as a second threshold, where the chat history is injected into the new chat session when the user affirmatively responds to the prompt.

12 Claims, 2 Drawing Sheets

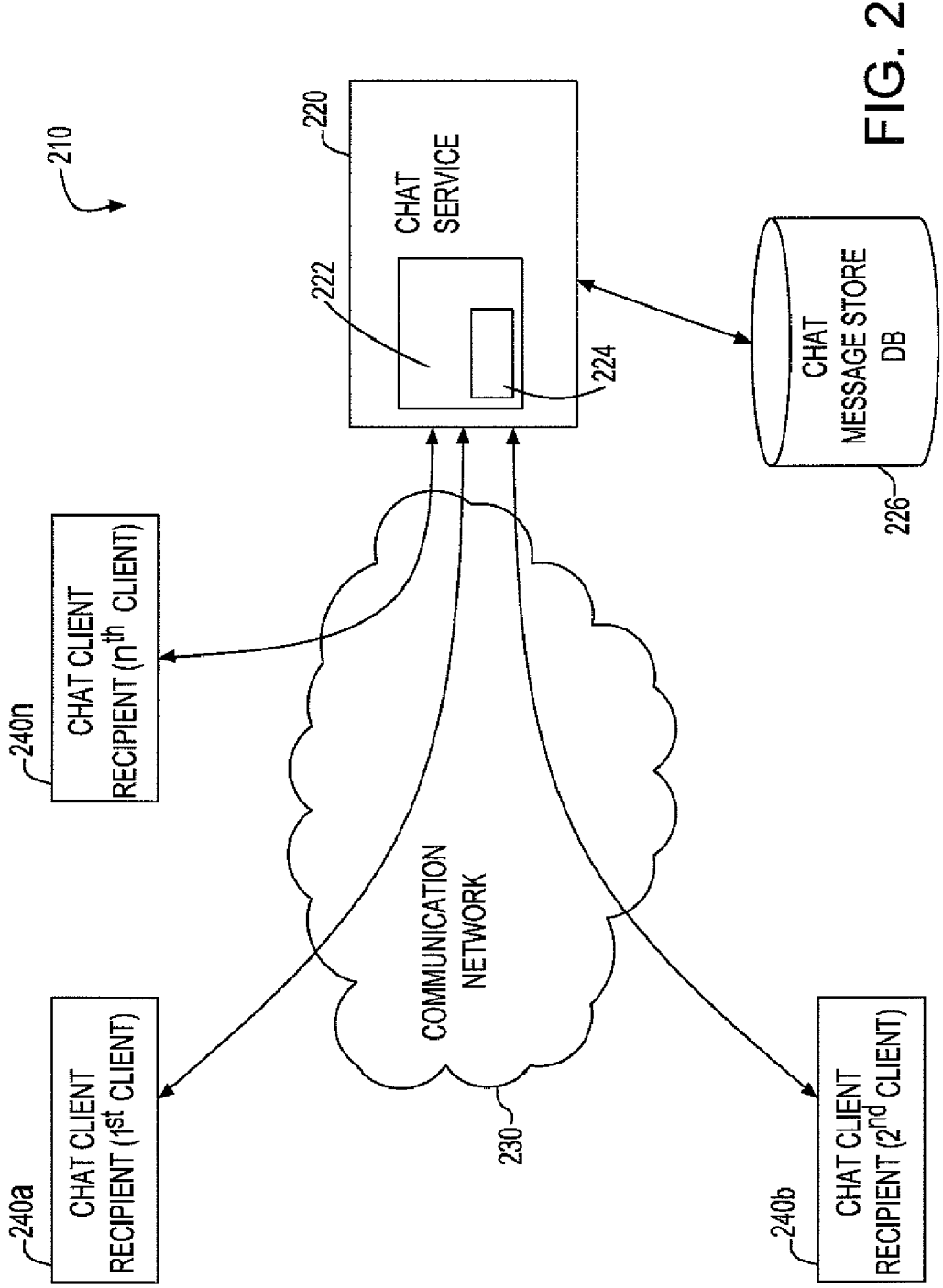

SYSTEM, METHOD AND COMPUTER PROGRAM PRODUCT FOR INTELLIGENT MULTI-PERSON CHAT HISTORY INJECTION

FIELD OF THE INVENTION

The invention relates generally to the field of collaboration between multiple parties. More specifically, the present application relates to searching and injecting the history of communication between multiple parties engaging in real-time collaboration.

BACKGROUND OF THE INVENTION

On-line network chat, or real-time computer chat, is well known and typically involves communication amongst two or more client computers across a computer network via a conference, or chat room. When a chat session is established in a chat room, messages sent from a client computer that is party to the chat session are sent to all other clients that are party to the session. The distribution of messages amongst the participating clients takes place substantially in real-time thereby giving the users of the client computers a sense of real-time communication with others.

Well known in the art is the ability to store a chat history, or a record of all client communications during a particular chat, that has taken place during a particular chat session to a storage medium. Often, however, chats about a single subject can take place over multiple chat sessions. In these situations, the chat history from a previous chat would be useful to retain context for the current chat session. Current solutions, however, do not recognize the continuation of a chat session and do not allow retrieval of a chat history for use in a current chat session.

SUMMARY OF THE INVENTION

There is provided a method, system, and computer program product for automatically searching and injecting a multi-person chat history into a chat session, and allowing users to inject a multi-person chat history into a new chat session. After comparing new chat session participants with chat history participants stored in a chat log within a predetermined temporal window to determine a number of similar participants after the new chat session is created, there is performed one of: injecting the chat history into the new chat session automatically when the number of similar participants is at least as great as a first predetermined threshold; or prompting a user response to inject the chat history into the new chat session when the number of similar participants is at least as great as a second threshold, where the chat history is injected into the new chat session when the user affirmatively responds to the prompt.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawing, wherein:

FIG. 2 is a schematic diagram illustrating another embodiment of the present invention.

DETAILED DESCRIPTION OF THE INVENTION

Figure 1:
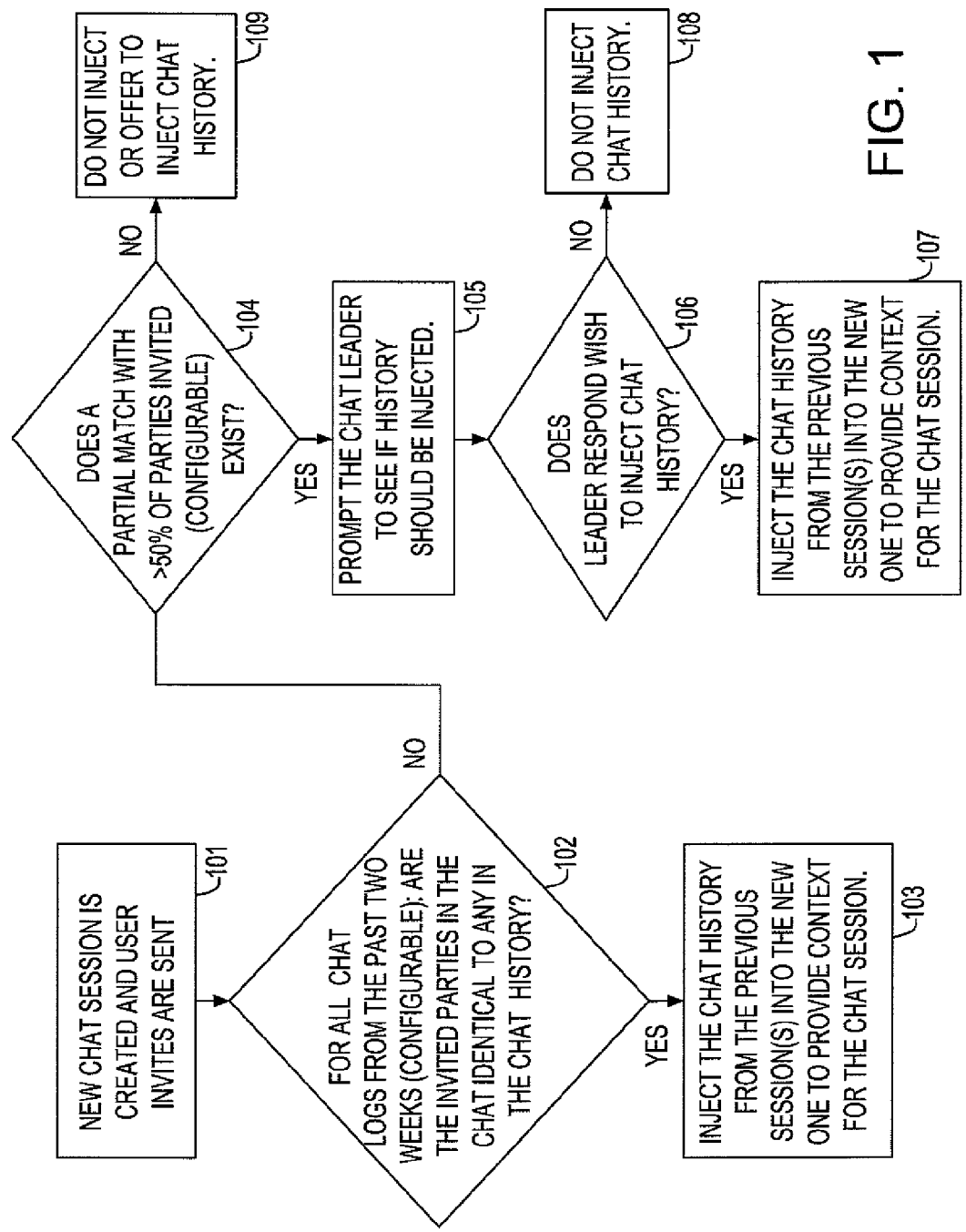
FIG. 1 is a flow chart illustrating one embodiment of the present invention.

A method, system, and program for injecting a chat history into a current chat session are provided. Whether the chat history is injected is determined by comparing the participants in the chat history with the participants of the chat session.

In the embodiment shown in FIG. 1, a new chat session is created by a user in step 101 and multiple participants are invited to join in the chat session. Sending invitations to join a chat session may take several different forms and may include one or more of the following: e-mail, Instant Messenger (IM) protocol or Short Messaging Service (SMS) protocol. One skilled in the art would readily see that other variations to sending invitations are possible. In addition, the user creating the chat session is known in the art as the chat session leader.

At step 102, all the chat logs are compared to determine whether any of the participants invited to join the new chat session have participated in previous chat sessions. In the embodiment shown in FIG. 1, step 102 is configured to limit its search to a specific search window of time; e.g. only search the chat session that have taken place in the past two weeks. As clear to one skilled in the art, however, the search window in step 102 may be assigned any temporal value (e.g. minutes, hours, days, etc) or no temporal value (i.e. search the entire chat log).

In addition, the embodiment shown in FIG. 1, at step 102, is configured to compare the number of matched participants with a first threshold value, an "automatic threshold". In one embodiment, the automatic threshold is a pre-set numeric value used to determine whether the chat history should be automatically injected into the chat session. For example, when the automatic threshold is met, the chat history is injected into the chat session without user input at step 103. While the embodiment of FIG. 1 sets the automatic threshold to be equal to the number of participants invited to the chat session, plus one (to include the chat session leader), other automatic threshold values are possible.

Although not shown in step 103, various mechanisms are capable of injecting a chat history that has been previously stored. In one embodiment, for example, the chat history (i.e. all previous conversations by the chat sessions participants amongst themselves) is retrieved from the chat log and broadcast to the members of the current chat session to appear in the chat application as part of the ongoing discussion. Those skilled in the art, however, would recognize that the present invention is not limited by this example.

If the number of matched participants found in step 102 does not match the automatic threshold, step 104 compares the number of matched participants with a second threshold, a "prompted threshold"—a pre-set numeric value used to determine whether to obtain user input to inject the chat history. While the embodiment of FIG. 1 sets the prompted threshold to be greater than half the number of participants invited to the chat session, those skilled in the art would recognize other prompted threshold values are possible.

When the prompted threshold is met, a user, preferably the chat leader, is asked in step 105 whether to inject the chat history into the current chat session, and the response is processed in step 106. If the chat leader answers affirmatively, then the chat history is injected in step 107. Alternatively, if the chat leader answers negatively, then the chat history is not injected, as shown in step 108.

If the neither the automatic threshold nor the prompted threshold have been met, the chat history is not injected, as shown in step 109, and chat messages are outputted to each user participating the current chat session.

FIG. 2 illustrates a block diagram of a Chat system 210 for supporting a chat session, e.g. instant messaging, in disconnected modes. Chat system 210 comprises a Chat service provider 220 including a Chat web-server device 222. Chat web-server device 222 includes chat processing and signal router functionality. Chat web-server device 222 is also coupled to data network 230 such as a local or wide area network(s). The embodiment shown in FIG. 2 is implemented for use with Chat systems in an Internet environment; however, other embodiments may be implemented in a corporate intranet, an extranet, or any other network environment. Data network 230 may also include a plurality of individual networks, such as wireless network and wired networks, each of which may include a plurality of individual workstations or like data processing devices. Chat web-server device 222, may be remotely located, and comprises one of any number of different types of computer devices that have message processing and message routing capabilities. These techniques are well known in the art, and the hardware devices and software which enable their use are readily available.

Further provided as part of the Chat system 210 supporting chat history injection in accordance with the invention, is the provision of Chat message store 226, comprising a database, hard disk memory storage, CD-ROM, RAM, memory, etc., that serves as the repository for stored, buffered messages and chat histories. Chat message store 226 may be implemented to simply store chat histories of chat sessions in a simple format; e.g., a single flat file formatted in a comma delimited format. It is also understood that Chat message store 226 may be implemented as a database, e.g. the IBM DB2 data server. Furthermore, while not shown in FIG. 2, it is understood that Chat message store 226 is accessible to Chat service provider 220 through a variety of mechanisms that include, but not limited to, an Internet or intranet network connection, an extranet network connection and a direct coupling. Other possibilities that allow Chat service provider 220 to access Chat message store 226 are readily apparent to those skilled in the art.

As shown in FIG. 2, several end-user client devices 240a, 240b, . . . , 240n that are enabled with an Chat-software application may be connected to the Chat web-server device 222 via the Internet or network connection using a wired connection, or a wireless connection. Wired connections are those that use physical media such as cables and telephone lines, whereas wireless connections use media such as satellite links, radio frequency waves, and infrared waves. It is understood that many connection techniques can be used with these various media, for example, using a cellular modem to establish a wireless connection. Particularly, the end-user's client device 240a, 240b, . . . , 240n may be any type of computer processor, including laptop, handheld or mobile computers; vehicle-mounted devices; desktop computers; mainframe computers; etc., having processing and communication capabilities. Each of these end-users may log in as a user of a Chat service provider 220 through an appropriate Chat application or routine. Although not shown, a user 240a, 240b may be connected to data network 230 and Chat service provider 220 through a gateway device using a Chat protocol. The gateway device will typically be provided by Chat web-server device 222 to which the user has subscribed and allows access to Chat system 210 after the user has logged in. The Chat application between Chat service 220 and data network 230 is configured to enable access to one or more appropriate Chat service provider(s).

Software programming code which embodies the Chat service 220 supporting disconnected modes according to the present invention is typically executed by a message processor 224 of Chat web-server device 222. It is also understood that in one embodiment Chat message store 236 is queried through the software programming code residing on message processor 224. The software programming code may be embodied on any of a variety of known media for use with a data processing system, such as a diskette, hard drive, or CD-ROM. The code may be distributed on such media, or may be distributed to end-user clients from the memory or storage of one computer system over data network 230 to the client computer devices 240a, 240b, . . . , 240n for use by users of such systems. The techniques and methods for embodying software programming code in memory, on physical media, and/or distributing software code via networks are well known and will not be further discussed herein.

It is understood that in other embodiments, the present invention may be implemented as one or more modules (also referred to as code subroutines, or "objects" in object-oriented programming) of a computer software program (or programs) that provides Chat, or instant messaging, capabilities. The program code of the preferred embodiment may be implemented as objects in an object-oriented programming language, or in a conventional procedurally-oriented language, or in a mix of object-oriented and procedural language code. In one embodiment, the code of the present invention operates on the server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular types of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed as new:

1. A method of managing chat history injection, comprising:
    storing all communications amongst participants during a chat session in a chat log to create a chat history;
    creating, subsequently, a new chat session;
    comparing new chat session participants with chat history participants stored in the chat log within a predetermined temporal window to determine a number of similar participants after the new chat session is created; and performing one of:
: injecting the chat history into the new chat session automatically when the number of similar participants is at least as great as a first predetermined threshold; or
: prompting a user response to inject the chat history into the new chat session when the number of similar participants is at least as great as a second threshold, where the chat history is injected into the new chat session when the user affirmatively responds to the prompt.

2. The method of claim 1, wherein the first predetermined threshold is equal to the number of participants in the chat history.

3. The method of claim 1, wherein the second threshold is greater than half the number of participants in the chat history.

4. The method of claim 1, wherein the user is the chat leader.

5. A computer program product for managing chat history injection, the computer program product comprising:
: a non-transitory storage medium readable by a processing circuit and storing instructions for execution by the processing circuit for performing a method, said method comprising:
: storing all communications amongst participants during a chat session in a chat log to create a chat history;
: creating, subsequently, a new chat session;
: comparing new chat session participants with chat history participants stored in the chat log within a predetermined temporal window to determine a number of similar participants after the new chat session is created; and
: performing one of:
:: injecting the chat history into the new chat session automatically when the number of similar participants is at least as great as a first pre-determined threshold; or
:: prompting a user response to inject the chat history into the new chat session when the number of similar participants is at least as great as a prompted threshold, where the chat history is injected into the new chat session when the user affirmatively responds to the prompt.

6. A system for managing chat history injection, comprising:
: a communications device for receiving and forwarding messages in a chat room between a chat sender application and a chat recipient application;
: a memory storage device, storing all communications amongst participants during a chat session in a chat log;
: a processor device, in communication with said memory device, configured to perform a method comprising:
: subsequently creating a new chat session;
: comparing new chat session participants with chat history participants stored in the chat log within a predetermined temporal window to determine a number of similar participants after the new chat session is created; and
: performing one of:
:: injecting the chat history into the new chat session automatically when the number of similar participants is at least as great as a first pre-determined threshold; or
:: displaying a prompt for a user response on said communications device to inject the chat history into the new chat session when the number of similar participants is at least as great as a second threshold, where the chat history is injected into the chat session when the user affirmatively answers to the prompt.

7. The method of claim 1, further comprising: outputting new chat communications among participants in the new chat session.

8. The method of claim 1, wherein said injecting or said prompting further comprises outputting new chat communications among participants in the new chat session.

9. The computer program product of claim 5, further comprising: outputting new chat communications among participants in the new chat session.

10. The computer program product of claim 5, wherein said injecting or said prompting further comprises outputting new chat communications among participants in the new chat session.

11. The system of claim 6, further comprising: displaying new chat communications among participants in the new chat session.

12. The system of claim 6, wherein said injecting or said displaying further comprises displaying new chat communications among participants in the new chat session.

* * * * *